(12) United States Patent
Park

(10) Patent No.: US 9,317,238 B2
(45) Date of Patent: Apr. 19, 2016

(54) IMAGE FORMING APPARATUS TO SUPPORT WI-FI DIRECT AND METHOD OF WI-FI DIRECT CONNECTING THEREIN

(71) Applicant: Hyun-wook Park, Suwon-si (KR)

(72) Inventor: Hyun-wook Park, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 126 days.

(21) Appl. No.: 13/799,700

(22) Filed: Mar. 13, 2013

(65) Prior Publication Data
US 2014/0092425 A1 Apr. 3, 2014

(30) Foreign Application Priority Data
Sep. 28, 2012 (KR) ........................ 10-2012-0109261

(51) Int. Cl.
| | | |
|---|---|---|
| *G06F 3/12* | (2006.01) | |
| *H04W 8/00* | (2009.01) | |
| *H04W 84/20* | (2009.01) | |
| *G06K 15/00* | (2006.01) | |
| *H04W 76/02* | (2009.01) | |

(52) U.S. Cl.
CPC ............ *G06F 3/1292* (2013.01); *H04W 8/005* (2013.01); *H04W 84/20* (2013.01); *H04W 76/023* (2013.01)

(58) Field of Classification Search
USPC ....................................................... 358/1.15
See application file for complete search history.

(56) References Cited

U.S. PATENT DOCUMENTS

| | | | | |
|---|---|---|---|---|
| 2006/0095548 | A1* | 5/2006 | Rabot et al. .................... | 709/220 |
| 2006/0165103 | A1* | 7/2006 | Trudeau et al. ............... | 370/401 |
| 2007/0047491 | A1* | 3/2007 | Dutta et al. .................... | 370/331 |
| 2007/0183426 | A1* | 8/2007 | Daude et al. ................... | 370/392 |
| 2008/0288614 | A1* | 11/2008 | Gil et al. ........................ | 709/220 |
| 2010/0255782 | A1* | 10/2010 | Klemmensen ............... | 455/41.2 |
| 2011/0041065 | A1* | 2/2011 | Bangma et al. ............... | 715/733 |
| 2011/0294502 | A1* | 12/2011 | Oerton ........................ | 455/426.1 |
| 2012/0174088 | A1* | 7/2012 | Jung et al. ..................... | 717/171 |
| 2012/0182979 | A1* | 7/2012 | Vedantham et al. .......... | 370/338 |
| 2012/0201201 | A1* | 8/2012 | Liu et al. ....................... | 370/328 |
| 2012/0297306 | A1* | 11/2012 | Hassan et al. ................. | 715/735 |
| 2012/0317619 | A1* | 12/2012 | Dattagupta et al. ............... | 726/4 |
| 2013/0057912 | A1 | 3/2013 | Park | |
| 2013/0148149 | A1 | 6/2013 | Park et al. | |
| 2013/0148161 | A1 | 6/2013 | Park et al. | |

(Continued)

FOREIGN PATENT DOCUMENTS

EP 2479665 7/2012

OTHER PUBLICATIONS

Excerpts from the Wi-Fi Peer-to-Peer (P2P) Technical Specification (Wi-Fi Alliance Technical Committee, P2P Task Group, Wi-Fi Peer-to-Peer (P2P) Technical Specification version 1.2, published Dec. 14, 2011).*

(Continued)

*Primary Examiner* — Dov Popovici
(74) *Attorney, Agent, or Firm* — Staas & Halsey LLP

(57) ABSTRACT

An image forming apparatus supporting a Wi-Fi Direct receives a request for a Wi-Fi Direct connection from an external wireless device, and allows to establish the Wi-Fi Direct connection between the image forming apparatus and the external wireless device by using device information that is previously stored with respect to wireless devices that were previously Wi-Fi Direct connected to the image forming apparatus.

13 Claims, 12 Drawing Sheets

(56) References Cited

U.S. PATENT DOCUMENTS

2013/0148162 A1    6/2013  Park et al.
2014/0068023 A1*   3/2014  Arickan .................. 709/220

OTHER PUBLICATIONS

Extended European Search Report dated Feb. 25, 2014 issued in EP Application No. 13162407.4.
Realtek: "Realtek Wi-Fi Direct Programming Guide", Jul. 27, 2011, XP055064785, Retrieved from the Internet: URL:http://rtl18192cu. googlecode.com/hg-history/bdd3a2265bdd6a92f24cef52fa594-b2844c9c1/document/RTK_Wi-Fi_Direct_Programming_guide.pdf [retrieved on May 31, 2013] * p. 9, par."6. DHCP"*.
Inventek Systems: "eS-WiFi Module Application Note AN20052 Software Enabled Access Point (SoftAp) Functionality (Included in Firmware Release 1.2)", Jul. 20, 2012, XP055095483, Retrieved from the Internet: URL: http://www.inventeksys.com/wp-content/uploads/2012/09/eS_WiFi_AN20052_Access_Point_r3.0.pdf [retrieved on Jan. 9, 2014] *pp. 8-10 *.

* cited by examiner

FIG. 10

| | MAC Address | Client identifier | Frequency of Connection |
|---|---|---|---|
| ☑ | 00:00:f0:a0:12:34 | SEC0000f0a01234 | 3 |
| ☐ | 00:00:f0:a0:12:35 | SEC0000f0a01235 | 1 |

Http://192.168.3.1

List of Mobile Devices that were previously connected delete   add

IMAGE FORMING APPARATUS TO SUPPORT WI-FI DIRECT AND METHOD OF WI-FI DIRECT CONNECTING THEREIN

CROSS-REFERENCE TO RELATED APPLICATIONS

This application claims priority under 35 U.S.C. §119 from Korean Patent Application No. 10-2012-0109261, filed on Sep. 28, 2012, in the Korean Intellectual Property Office, the disclosure of which is incorporated herein in its entirety by reference.

BACKGROUND OF THE INVENTION

1. Field of the Invention

The present general inventive concept relates to an image forming apparatus to support Wi-Fi Direct, and more particularly, to an image forming apparatus to communicate with an external wireless device by supporting Wi-Fi Direct and a method of Wi-Fi Direct connecting.

2. Description of the Related Art

Recently, peer-to-peer (P2P) communication by which wireless devices are directly connected without an additional wireless connecting apparatus is generalized and widely used. For example, Bluetooth enables such P2P communication. Although Bluetooth is limited to some extent in terms of transmission speed and transmission range, new versions of Bluetooth are continuously being developed to supplement the limitations.

In addition, Wi-Fi, which is a wireless local area network (LAN) standard based on IEEE 802.11 regulated by Wi-Fi Alliance, is basically a technology that allows using ultra-high speed internet by accessing an access point (AP) connected to a network infrastructure; however, Wi-Fi may serve the P2P communication by using an ad hoc mode. When using this ad-hoc mode, however, security is weakened, a transmission speed decreases, and an establishing method thereof is difficult to perform. Accordingly, Wi-Fi Alliance has suggested Wi-Fi Direct as a technique that makes P2P communication possible. Wi-Fi Direct allows P2P connection between wireless devices without using an AP, supports a transmission speed of a maximum of 250 Mbps, and performs security settings by using Wi-Fi protected access 2 (WPA2), in order to address problems of the ad-hoc function. In addition, Wi-Fi Direct supports a transmission range of a 200 m maximum, and thus, is considered as a substitute for P2P communication.

As described above, with the appearance of Wi-Fi Direct, use of P2P communication has increased more. However, P2P communication technology may need to be applied to image forming apparatuses, such as printers, scanners, fax machines, and multi-function printers. Accordingly, it is necessary to provide a technique for safely and easily using an image forming apparatus supporting P2P connection.

SUMMARY OF THE INVENTION

The present general inventive concept provides an image forming apparatus to support Wi-Fi Direct and a method of Wi-Fi Direct connecting.

The present general inventive concept also provides a computer-readable recording medium to contain computer-readable codes as a program to execute a method of Wi-Fi Direct connecting an image forming apparatus and a wireless device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an image forming apparatus to support Wi-Fi Direct, the apparatus including a wireless interface unit to receive a request for a Wi-Fi Direct connection from an external wireless device, a memory unit to store device information about wireless devices that were previously Wi-Fi Direct connected to the image forming apparatus, and a central processing unit to determine whether device information of the external wireless device that has requested the Wi-Fi Direct connection is stored in the memory unit, based on the stored device information, wherein when the external wireless device that has requested the Wi-Fi Direct connection is determined as corresponding to the stored device information, the central processing unit allows to establish a Wi-Fi Direct connection between the image forming apparatus and the external wireless device via the wireless interface unit.

The foregoing and/or other features and utilities of the present general inventive concept may also be achieved by providing an image forming apparatus to support Wi-Fi Direct, the apparatus including a print engine to conduct a printing operation, a memory unit to store device information about wireless devices that were previously Wi-Fi Direct connected to the image forming apparatus, a first wireless interface unit to connect to an access point (AP) of a network infrastructure, a second wireless interface unit to receive a request for Wi-Fi Direct connection from an external wireless device, a central processing unit to determine whether device information of the external wireless device that has requested Wi-Fi Direct connection is stored in the memory unit, based on the stored device information, a soft AP unit to allow the image forming apparatus to act as an AP when a Wi-Fi Direct connection is established, and a Dynamic Host Configuration Protocol (DHCP) server unit to allocate an IP address to a wireless device that is Wi-Fi Direct connected to the image forming apparatus, wherein the central processing unit allows a Wi-Fi Direct connection to be established between the image forming apparatus and the external wireless device via the second wireless interface unit if the external wireless device that has requested the Wi-Fi Direct connection is determined as corresponding to the stored device information.

The foregoing and/or other features and utilities of the present general inventive concept may also be achieved by providing a method of Wi-Fi Direct connecting in an image forming apparatus, the method including receiving a request for Wi-Fi Direct connection from an external wireless device, determining whether device information of the external wireless device that has requested the Wi-Fi Direct connection is stored, based on device information about wireless devices that were previously Wi-Fi Direct connected to the image forming apparatus which is stored in advance, and allowing to establish a Wi-Fi Direct connection if the external wireless device that has requested the Wi-Fi Direct connection is determined as corresponding to the stored device information.

The foregoing and/or other features and utilities of the present general inventive concept may be achieved by providing a computer-readable recording medium having embodied thereon a program to execute the method described above and below.

The foregoing and/or other features and utilities of the present general inventive concept may also be achieved by providing an image forming apparatus to support a Wi-Fi Direct, including a wireless interface unit to receive a request for a current Wi-Fi Direct connection from an external wireless device, and a central processing unit to determine whether there was a previous Wi-Fi Direct connection with the external wireless device, and to establish the current Wi-Fi Direct connection with the external wireless device according to the determination, to receive one of a command and data according to the established current Wi-Fi Direct connection, and to perform a printing operation using a print engine according to the received one of the command and data.

The central processing unit may establish the current Wi-Fi Direct connection without a user input of one of a push button and a pin code.

The central processing unit may compare previous information obtained through the previous Wi-Fi Direct connection with information on the current Wi-Fi Direct connection to determine that the external wireless device previously had the previous Wi-Fi Direct connection with the wireless interface unit.

The information may be at least one of a MAC address, an IP address, and an DHCP client identifier.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 10 illustrates a list of device information displayed by using a user interface unit or an embedded web server (EWS) according to an embodiment of the present general inventive concept;

DETAILED DESCRIPTION OF THE PREFERRED EMBODIMENTS

Figure 1:
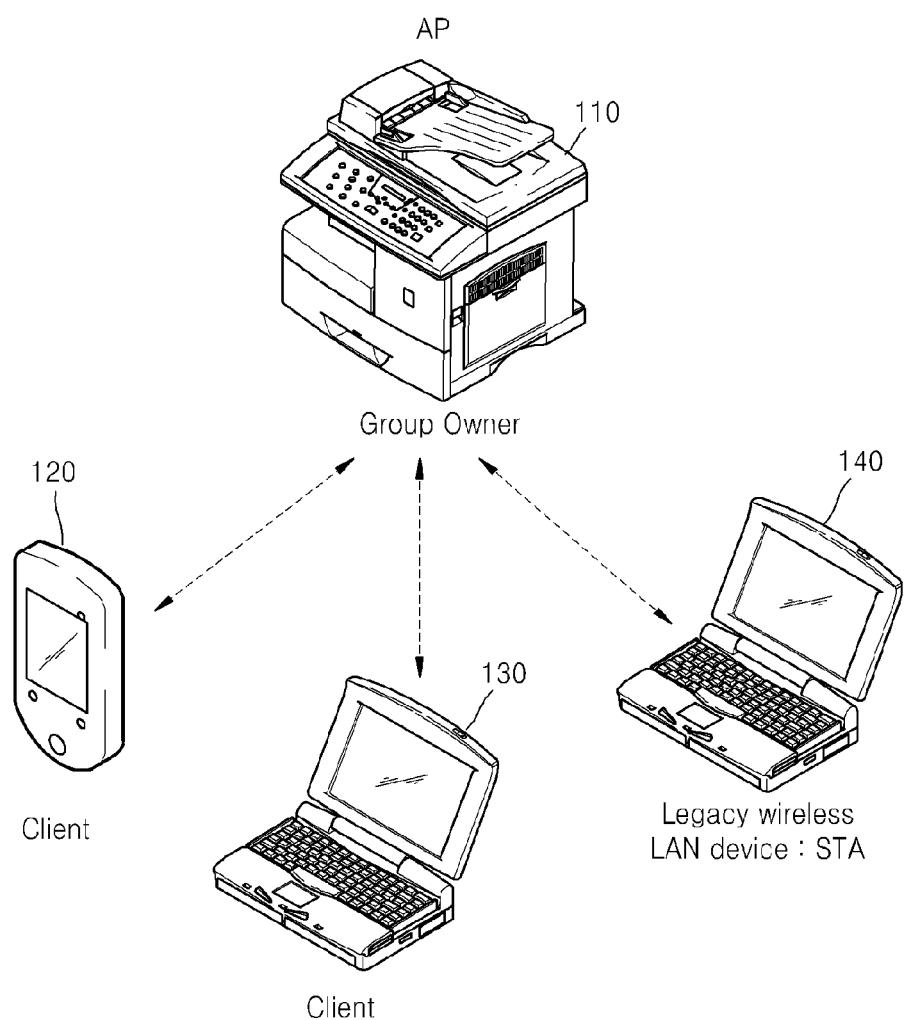
FIG. 1 illustrates wireless local area network (WLAN) devices that support Wi-Fi Direct and are wirelessly connected to one another to form a wireless network and a legacy WLAN device.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. For clarity of description of the features of the embodiments of the present invention, details that are well-known to one of ordinary skill in the art will be omitted. Expressions such as "at least one of," when preceding a list of elements, modify the entire list of elements and do not modify the individual elements of the list.

Hereinafter, a multi-function printer (MFP) that supports Wi-Fi Direct will be described as an example of an image forming apparatus supporting a peer-to-peer (P2P) connection. However, the present general inventive concept is not limited thereto. It is possible that it can be applied to a printer, a scanner, a fax machine, etc., to perform a printing and/or scanning operation.

Before describing embodiments of the present general inventive concept, basic connections and operations of an MFP that supports Wi-Fi Direct will be described with reference to accompanying drawings.

FIG. 1 illustrates wireless local area network (WLAN) devices that are wirelessly connected to one another to form a wireless network and a legacy WLAN device. Referring to FIG. 1, an MFP 110 supports Wi-Fi Direct and is wirelessly connected to a smart phone 120 supporting the Wi-Fi Direct, a laptop computer 130 supporting the Wi-Fi Direct, and a legacy WLAN laptop computer 140. The legacy WLAN laptop computer 140 refers to a laptop computer, to which conventional WLAN technology is applied and which does not support the Wi-Fi Direct. Here, "supporting the Wi-Fi Direct" is referred to as "having components to communicate with a wireless device using the Wi-Fi Direct."

WLAN devices may support Wi-Fi Direct, hereinafter referred to as Wi-Fi Direct devices, and may be P2P connected, unlike other conventional Wi-Fi supporting devices. In detail, according to the conventional Wi-Fi technology, to form a WLAN, a Wi-Fi device may be wirelessly connected to a router connected to a network infrastructure that is already established, that is, an access point (AP). Here, Wi-Fi devices that are wirelessly connected may be regarded as acting as a station. However, according to the Wi-Fi Direct, one of the Wi-Fi Direct devices that are to form a wireless network functions as an AP, and the rest of Wi-Fi Direct devices are wirelessly connected to the Wi-Fi Direct device functioning as an AP and function as stations. Accordingly, a wireless network between Wi-Fi Direct devices may be formed without an AP connected to a network infrastructure. In addition, once a wireless network is formed between Wi-Fi Direct devices, legacy WLAN devices, such as Wi-Fi devices, may recognize the Wi-Fi Direct device functioning as an AP, and may function as stations to be wirelessly connect thereto.

Referring to FIG. 1, the Wi-Fi Direct MFP 110, the Wi-Fi Direct smart phone 120, and the Wi-Fi Direct laptop computer 130, which are Wi-Fi Direct devices, form a wireless network without an AP connected to a network infrastructure. As devices supporting Wi-Fi Direct are wirelessly connected to one another without an AP connected to a network infrastructure, a P2P group may be formed. Here, the Wi-Fi Direct MFP 110 functions as an AP, and a device that functions as an AP among the Wi-Fi Direct devices is referred to as a group owner (GO) of a P2P group. The Wi-Fi Direct smart phone 120 and the Wi-Fi Direct laptop computer 130 are wirelessly connected to the Wi-Fi Direct MFP 110, which is a GO, and function as stations that are referred to as clients. The legacy WLAN laptop computer 140, which does not support Wi-Fi Direct, recognizes the Wi-Fi Direct MFP 110, which is a GO, as an AP, so as to wirelessly connect to a wireless network that the Wi-Fi Direct devices have formed.

While the Wi-Fi Direct MFP 110 is illustrated as a GO among the Wi-Fi Direct devices in FIG. 1, according to another embodiment, other Wi-Fi Direct devices, for example, one of the Wi-Fi Direct smart phone 120 and the Wi-Fi Direct laptop computer 130, may be a GO, and the Wi-Fi Direct MFP 110 may be a client or a station to allow wireless connection. Which Wi-Fi Direct device is going to be a GO is determined in an operation of Wi-Fi Direct connection through negotiation between them, as described below in detail. A Wi-Fi Direct device may become a GO by itself before being connected without negotiation, and such a Wi-Fi Direct device is referred to as an autonomous group owner (AGO). Also, a wireless network that is formed around an AGO is referred to as an autonomous P2P group. When an autonomous P2P group is formed, a legacy WLAN device may recognize the AGO as an AP of a network infrastructure and connect thereto.

Although FIG. 1 illustrates a P2P group that is formed by Wi-Fi Direct devices without an AP connected to a network infrastructure, if there is an AP connected to a network infrastructure, Wi-Fi Direct devices may also connect to the AP and may function as stations.

Hereinafter, an operation of wireless connection between Wi-Fi Direct devices and characteristics of Wi-Fi Direct will be described in detail. For easy understanding, an MFP supporting Wi-Fi Direct (hereinafter, a Wi-Fi Direct MFP) will be described as an example. However, the scope of the present invention is not limited thereto, and examples of Wi-Fi Direct devices may include any devices such as a printer, a scanner, or a fax machine that supports Wi-Fi Direct. Also, while Wi-Fi Direct is described as an example of P2P communication, other P2P communication methods such as Bluetooth or Zigbee may also be regarded as being included in the embodiments of the present invention within an applicable range.

Figure 2:
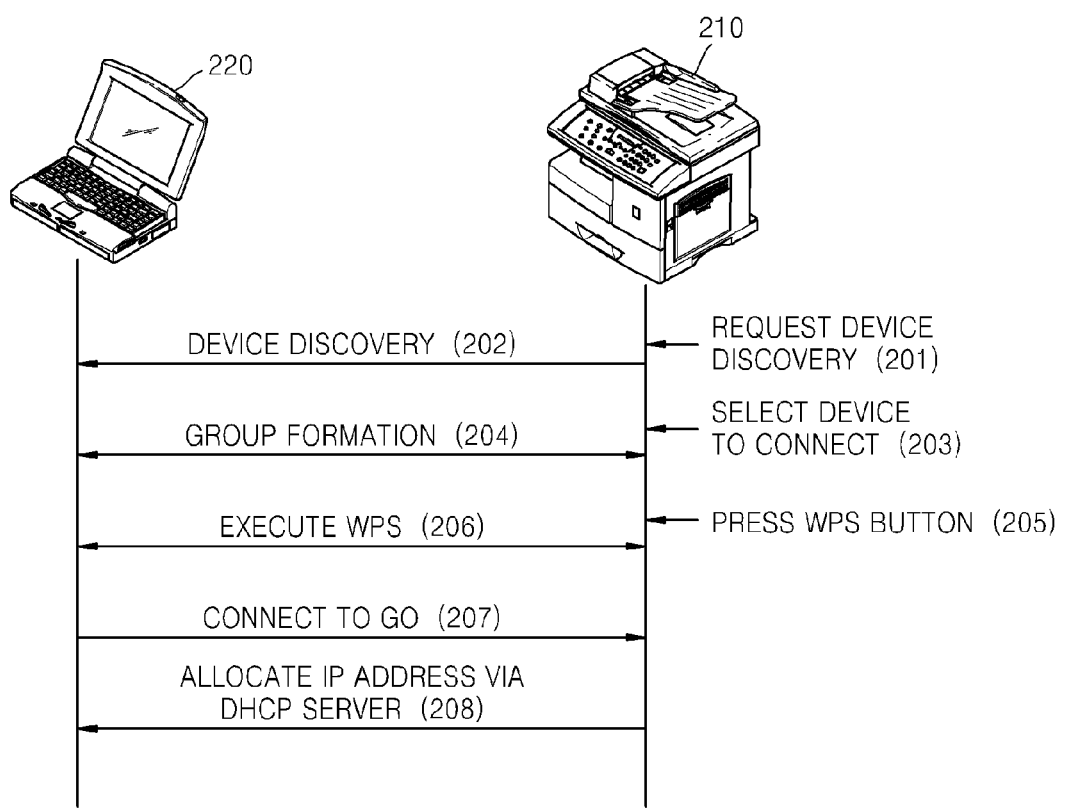
FIG. 2 is a view illustrating an operation of wireless connection between Wi-Fi Direct devices.

FIG. 2 is a view illustrating an operation of wireless connection between Wi-Fi Direct devices. FIG. 2 illustrates a Wi-Fi direct connection between a Wi-Fi Direct MFP 210 and a Wi-Fi Direct laptop computer 220, for example. The Wi-Fi Direct connection includes a device discovery, a group formation, and a secure connection. Referring to FIG. 2, the Wi-Fi Direct MFP 210, which is one of the Wi-Fi Direct devices, receives a request 201 for the device discovery, and searches whether there is a near Wi-Fi Direct device in operation 202. The request for the device discovery may be received via a user interface unit of the Wi-Fi Direct MFP 210, for example, via a user interface unit implemented on a display, such as a liquid crystal display (LCD), included in the Wi-Fi Direct MFP 210. After the Wi-Fi Direct MFP 210 performs the device discovery, if a near Wi-Fi Direct device is found, the Wi-Fi Direct MFP 210 shows a device found through the device discovery to a user on the display, and receives a connection request 203 from the user. The connection request 203 may also be received by pressing a button or by touching a touch panel via the display of the Wi-Fi Direct MFP 210, and if a plurality of Wi-Fi Direct devices are found, the Wi-Fi Direct MFP 210 may show them as a list on the display and the user may select one of them and request a connection thereto.

Upon receiving the connection request 203, the group formation is conducted between Wi-Fi Direct devices that are to be connected in operation 204. Group formation refers to determining which Wi-Fi Direct devices are to be connected to one another, and which of the Wi-Fi Direct devices is going to be a GO or a client. Which Wi-Fi Direct device is going to be a GO is determined through negotiation between the Wi-Fi Direct devices, as described below with reference to FIG. 4 in detail.

When groups are formed, devices of each group need secure connections, a technique for which is Wi-Fi Protected Setup (WPS). WPS refers to a function of easily establishing a secure connection between Wi-Fi supporting devices. Examples of WPS include a personal identification number (PIN) method and a push button configuration (PBC) method. In the PIN method, a previously set PIN code is input to establish a secure connection. In the PBC method, a WPS button included in a Wi-Fi Direct device is pressed to establish a secure connection.

The PCB method will be described below. A user may request secure connection by pressing a WPS button included in the Wi-Fi Direct MFP 210 in operation 205. Then, secure connection may be established by pressing a WPS button included in the Wi-Fi Direct laptop computer 220 or a WPS button implemented on an application program for Wi-Fi Direct connection of the Wi-Fi Direct laptop computer 220 within a predetermined period of time, for example, within 120 seconds. The WPS button implemented on an application program for the Wi-Fi Direct connection of the Wi-Fi Direct laptop computer 220 means an object that is displayed on a display of the Wi-Fi Direct laptop computer 220 according to an application program for the Wi-Fi Direct connection. A detailed example of the WPS button is indicated by reference numeral 510 of FIG. 5 which will be described below. A user may request the secure connection by clicking a WPS button displayed on a display of the Wi-Fi Direct laptop computer 220 by using a mouse or the like. When the WPS button is pressed to request secure connection, one of the Wi-Fi Direct devices that is designated as a GO in the group formation operation transmits security information to devices that are designated as clients in operation 206. As secure connection is established by encoding the security information according to the Wi-Fi Protected Access 2 (WPA2)-Pre-Shared Key (PSK) authorization method according to Wi-Fi Direct, security performance is much higher than conventional methods, such as a Wired Equivalent Privacy (WEP) method or a Wi-Fi Protected Access (WAP) method.

When conducting WPS, a Wi-Fi Direct device that is a client is connected to a Wi-Fi Direct device that is a GO in operation 207, and the Wi-Fi Direct device that is a GO uses a Dynamic Host Configuration Protocol (DHCP) server to automatically allocate an Internet protocol (IP) address to Wi-Fi Direct devices in operation 208 to thereby complete P2P connection between Wi-Fi Direct devices.

As described above, in the operation of wireless connection of Wi-Fi Direct devices, in the Wi-Fi Direct MFP 210, operation 205 of pressing a WPS button according to the PBC method or the PIN method is necessary. When the Wi-Fi Direct MFP 210 is used at homes or in offices, the same wireless devices of a user (e.g., the Wi-Fi Direct smart phone 120, the Wi-Fi Direct laptop computer 130, and the legacy WLAN laptop computer 140) may attempt the Wi-Fi Direct connection to the Wi-Fi Direct MFP 210. Accordingly, in the wireless connection operation between Wi-Fi Direct devices of the Wi-Fi Direct MFP 210, it may be necessary to perform the operation 205 of pressing a WPS button according to the PBC method or the PIN method.

In order to provide convenience to the user, an operation of wireless connection between Wi-Fi Direct devices according to the embodiment of the present general inventive concept may be performed to omit the operation 205 of pressing a WPS button formed on wireless devices to be successfully connected via Wi-Fi Direct. This will be described in more detail with respect to a wireless connection operation between Wi-Fi Direct devices with reference to FIGS. 9 through 15. Hereinafter, a Wi-Fi Direct technology is described for better understanding of the embodiment of the present general inventive concept.

Although a basic operation of connecting Wi-Fi Direct devices has been described above, each connecting operation and characteristics of Wi-Fi Direct will be described in detail with reference to the drawings hereinafter.

Figure 3:
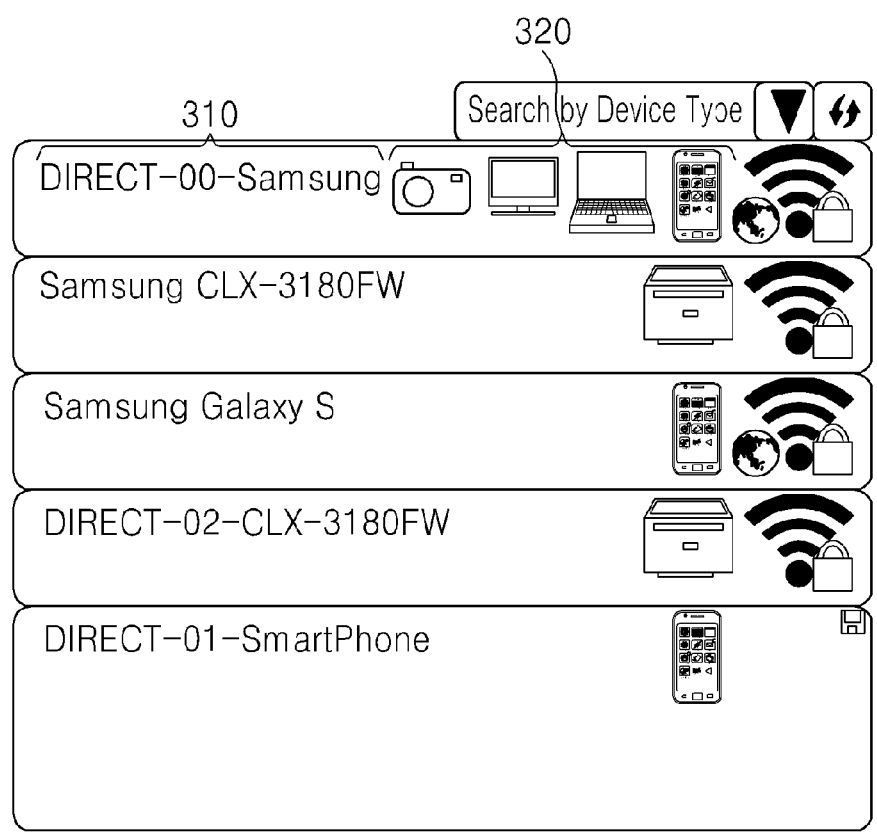
FIG. 3 illustrates a list of Wi-Fi Direct devices after performing device discovery in a Wi-Fi Direct device according to an embodiment of the present general inventive concept.

FIG. 3 illustrates a list of found Wi-Fi Direct devices after performing a device discovery in a Wi-Fi Direct device according to an embodiment of the present general inventive concept. When the Wi-Fi Direct device conducts the device discovery, device information, such as a type of a device and a service set identifier (SSID), is exchanged via a probe request and a probe response that are WLAN packets transmitted between them, and the device that conducts the device discovery displays the collected information. As illustrated in FIG. 3, an SSID 310 and a device type 320 of Wi-Fi Direct devices that are found to be near are represented as text or icons. Here, all of the found devices may be displayed on the list; however, the devices may be filtered according to device types so that a list including only desired types of devices may be displayed. According to the Wi-Fi Direct technology, the device types are classified and defined according categories or user preferences. The categories may be computers, input devices, printers, scanners, fax machines, copy machines, and cameras, and each category is divided into sub-categories. For example, a computer is classified into sub-categories of a personal computer (PC), a server, and a laptop computer, and the like.

Figure 4:
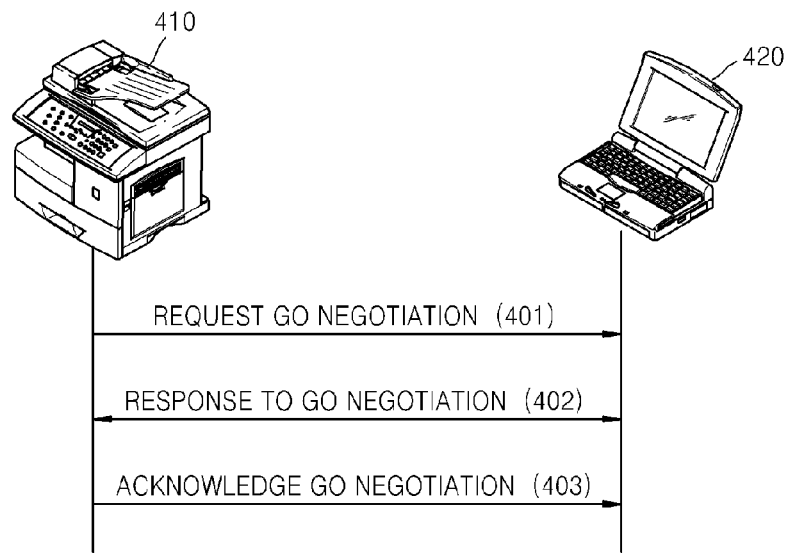
FIG. 4 is a detailed view illustrating an operation of group formation during a connecting operation between Wi-Fi Direct devices.

FIG. 4 is a detailed view illustrating an operation of a group formation during a connecting operation between Wi-Fi Direct devices. Group formation may be referred to as deciding which Wi-Fi Direct devices are to be connected to one another to form a network, which device is to be a GO, and which device is going to be a client. For example, when a Wi-Fi Direct MFP 410 conducts the device discovery, and a laptop computer 420 is selected among the found Wi-Fi Direct devices to attempt the connection, the Wi-Fi Direct MFP 410 sends a GO negotiation request to the laptop computer 420 in operation 401. The laptop computer 420 that has received a GO negotiation request compares one or more intent values of the laptop computer 420 and those of the Wi-Fi Direct MFP 410. When the intent value of the Wi-Fi Direct MFP 410 is greater than that of the laptop computer 420, the laptop computer 420 designates the Wi-Fi Direct MFP 410 as a GO. When the intent value of the Wi-Fi Direct MFP 410 is not greater than that of the laptop computer 420, the laptop computer 420 designates itself as a GO. Here, the intent value refers to a value representing a degree of task intent in each device, and is determined by a manufacturer or design preference or a user preference. Devices to which power is supplied all the time as a main power source, like an MFP, may have a relatively high intent value. As described above, after determining which device is going to be a GO by comparing the intent values, the laptop computer 420 sends the corresponding result to the Wi-Fi Direct MFP 410 as a response to the GO negotiation in operation 402. The Wi-Fi Direct MFP 410 that receives the determination result transmits an acknowledgement to the laptop computer 420 in operation 403 in order to confirm the receipt of the negotiation to thereby complete the group formation. When the group formation is completed, the Wi-Fi Direct device, which is the GO, manages security information and SSIDs of the other Wi-Fi Direct devices included in the group.

Figure 5:
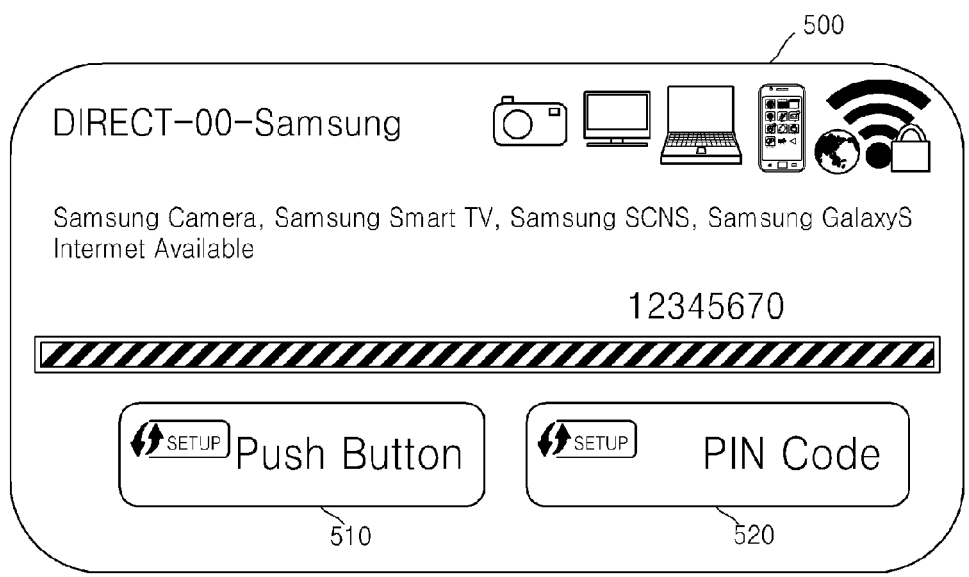
FIG. 5 illustrates a display screen to execute Wi-Fi Protected Setup (WPS)

When the group formation is completed, a secure connection is established between the Wi-Fi Direct devices included in the group through WPS. FIG. 5 illustrates a display screen 500 for executing WPS. The display screen 500 illustrated in FIG. 5 may be displayed on a user interface unit of a display of a Wi-Fi Direct MFP. Referring to FIG. 5, the user may select a WPS button 510 or a PIN code 520 to execute WPS. When executing WPS via the WPS button 510, the WPS button 510 of the Wi-Fi Direct MFP is pressed. When the WPS buttons of devices to be connected are pressed within a predetermined period of time, the security information is automatically exchanged between the devices such that a secure connection is established. Here, when the Wi-Fi Direct device that is the GO provides the security information, the Wi-Fi Direct devices that are the clients receive the security information. Also, the secure connection is established by encoding the security information using a WPA2-PSK authorization method, and thus, high security may be achieved.

However, as described above, an input of the WPS button 510 of FIG. 5 may be unnecessary if the Wi-Fi Direct connection is repeatedly attempted by the same wireless devices, to which the user has previously connected before the Wi-Fi Direct connection is attempted, in the same Wi-Fi Direct environment like the home or office. Accordingly, an operation of the wireless connection between Wi-Fi Direct devices according to the embodiment of the present general inventive concept may be omitted in FIG. 5 with respect to the Wi-Fi Direct devices according to the embodiment of the present general inventive concept. This will be described below in detail with respect to an operation of a wireless connection between Wi-Fi Direct devices with reference to FIGS. 9 through 15 below.

Figure 6:
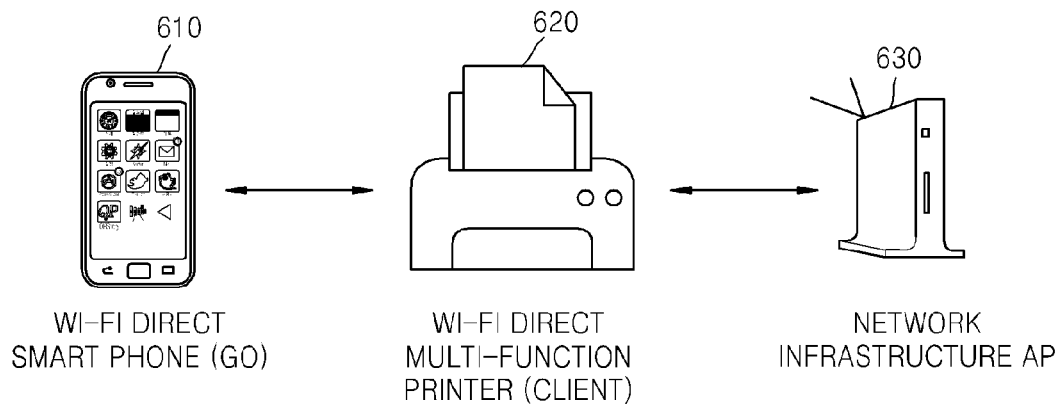
FIG. 6 illustrates Wi-Fi Direct devices that are concurrently connected.

A Wi-Fi Direct device may be connected to a network infrastructure and then may be connected to another Wi-Fi Direct device through P2P connection at the same time, and this is called concurrent connection. FIG. 6 illustrates Wi-Fi Direct devices that are concurrently connected. Referring to FIG. 6, a Wi-Fi Direct MFP 620 is connected to a smart phone 610, which is another Wi-Fi Direct device, through P2P connection, and is connected to an AP 630 of a network infrastructure at the same time. The Wi-Fi Direct MFP 620 is connected to the smart phone 610 through P2P connection, and thus may directly transmit or receive printing data or the like from the smart phone 610, and may directly transmit or receive printing data from the network infrastructure via the AP 630 at the same time.

When Wi-Fi Direct devices are concurrently connected as illustrated in FIG. 6, or when a Wi-Fi Direct device is connected using wires to a network infrastructure and also connected to another Wi-Fi Direct device through P2P connection at the same time, different IP addresses and MAC addresses may be used for each connection, that is, for connection to the network infrastructure and connection to the other Wi-Fi Direct device. This is referred to as multihoming. This multihoming allows the Wi-Fi Direct device to support different services according to respective interfaces that are concurrently connected. For example, services of all functions of an MFP may be provided via an interface connected to the network infrastructure but only services partial functions of the MFP may be provided via an interface that is connected to another Wi-Fi Direct device.

Figure 7:
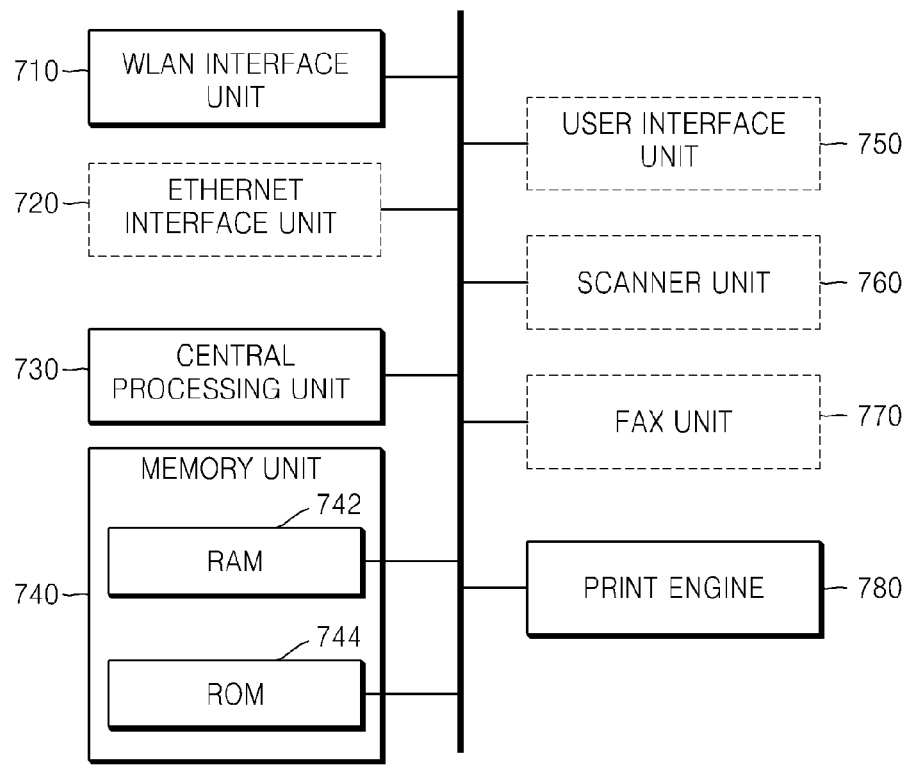
FIG. 7 is a block diagram illustrating a hardware structure of an image forming apparatus supporting Wi-Fi Direct according to an embodiment of the present general inventive concept.

FIG. 7 is a block diagram illustrating a hardware structure of an image forming apparatus supporting a Wi-Fi Direct according to an embodiment of the present general inventive concept. Referring to FIG. 7, the image forming apparatus supporting Wi-Fi Direct may include a WLAN interface unit 710, an Ethernet interface unit 720, a central processing unit (CPU) 730, a memory unit 740, a user interface unit 750, a scanner unit 760, a fax unit 770, and a print engine 780. The memory unit 740 may include a random access memory (RAM) 742 and a read only memory (ROM) 744. If the image forming apparatus supports only WLAN, the Ethernet interface unit 720 may not be included. Also, if the image forming apparatus is a printer, the scanner unit 760 and the fax unit 770 may not be included.

When Wi-Fi Direct devices are concurrently connected as illustrated in FIG. 6, or when a Wi-Fi Direct device is connected using wires to a network infrastructure and also connected to another Wi-Fi Direct device through P2P connection at the same time, different IP addresses and MAC addresses may be used for each connection, that is, for connection to the network infrastructure and connection to the other Wi-Fi Direct device. This is referred to as multihoming. This multihoming allows the Wi-Fi Direct device to support different services according to respective interfaces that are concurrently connected. For example, services of all functions of an MFP may be provided via an interface connected to the network infrastructure but only cervices partial limited support for some functions of the MFP may be provided via an interface that is connected to another Wi-Fi Direct device.

Figure 8:
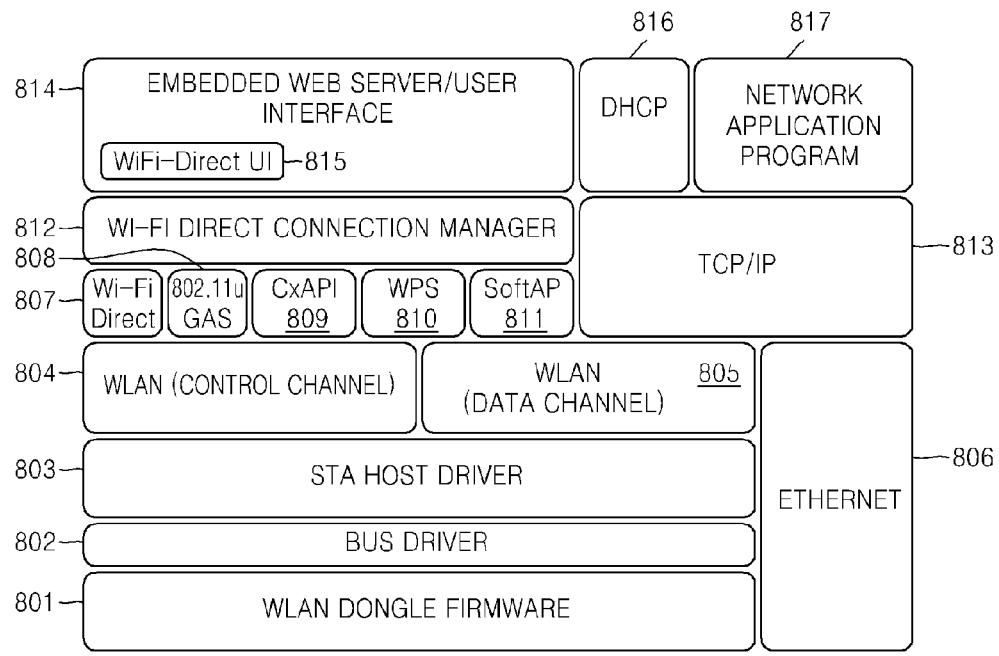
FIG. 8 is a block diagram illustrating a software structure of an image forming apparatus supporting Wi-Fi Direct according to an embodiment of the present general inventive concept.

FIG. 8 is a block diagram illustrating a software structure of an image forming apparatus supporting a Wi-Fi Direct according to an embodiment of the present general inventive concept. The software structure of the image forming apparatus supporting the Wi-Fi Direct will be briefly described below with reference to FIG. 8.

A WLAN dongle firmware 801 is firmware for WLAN connection, which may be stored in WLAN dongle hardware or may be transmitted from a main board of an image forming apparatus to the WLAN dongle hardware when booting the image forming apparatus. A bus driver 802 and a serial ATA (STA) host driver 803 are each a low level bus driver for communication with WLAN hardware. A WLAN control channel 804 and a WLAN data channel 805 refer to channels for communicating with WLAN firmware. A Wi-Fi Direct module 807 is a module that conducts Wi-Fi Direct connection and provides an operating command to the WLAN firmware. An IEEE 802.11u generic advertisement service (GAS) module 808 performs functions according to IEEE 802.11u GAS, and a WPS module 810 performs a WPS function. A soft AP module 811 is a software module that helps an image forming apparatus to act as an AR A transmission control protocol (TCP)/IP 813 is a standard protocol for network transmission. A Wi-Fi Direct connection manager 812 is a module for controlling Wi-Fi Direct connection. A Wi-Fi Direct user interface 815 allows the user to conduct settings related to Wi-Fi Direct, and may be included in an embedded web server (EWS) 814. A DHCP server 816 automatically allocates an IP to a Wi-Fi Direct device that is connected as a client. A network application program 817 allows various application operations related to a network.

The Wi-Fi Direct technology described above has the following advantages.

The Wi-Fi Direct device is connectable to other devices anywhere and anytime, and thus, has maximum mobility and portability. If a new Wi-Fi Direct device is added, the Wi-Fi Direct device may be immediately connected to the new Wi-Fi Direct device and used. In addition, it may be identified whether there is an available device or service before establishing the connection to other devices, and thus, the Wi-Fi direct devices may be conveniently used. In addition, the connection may be performed simply and stably by a simple operation, for example, pressing a WPS button, and the connection may be performed with high security functions by using the WPA2 technology.

Also, Wi-Fi Direct technology may provide various functions that may not be provided by a conventional WLAN technology.

For example, a device discovery function whereby near Wi-Fi Direct devices may be found according to device types; a service discovery function corresponding to services provided by near Wi-Fi Direct devices may be found; a power management function that allows an efficient use of electrical power; a concurrent connection function that may form a P2P connection between the Wi-Fi Direct devices while connecting to an existing network infrastructure; a function of separating a security domain between the network infrastructure connection and the Wi-Fi Direct connection; and a cross-connection function which allows sharing of an internet connection may be provided by the Wi-Fi Direct technology.

Also, as the Wi-Fi Direct technology is based on IEEE 802.11, the Wi-Fi Direct devices are compatible with conventional legacy WLAN devices.

Hereinafter, a method of Wi-Fi Direct connecting in an image forming apparatus supporting a Wi-Fi Direct according to an embodiment of the present general inventive concept will be described in detail with reference to FIGS. 9 through 15.

Figure 9:
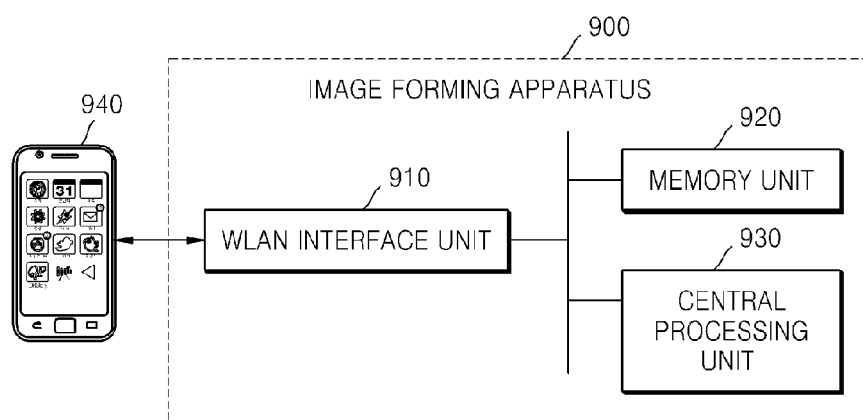
FIG. 9 is a block diagram illustrating a hardware structure of an image forming apparatus supporting Wi-Fi Direct, according to an embodiment of the present general inventive concept.

FIG. 9 is a block diagram illustrating an image forming apparatus 900 supporting a Wi-Fi Direct, according to an embodiment of the present general inventive concept.

Since the hardware structure of the image forming apparatus has been explained above with reference to FIG. 7, detail descriptions thereof will be omitted.

FIG. 9 illustrates hardware components included in the image forming apparatus 900 to support the Wi-Fi Direct without illustrating all the hardware components of the image forming apparatus illustrated in FIG. 7.

A WLAN interface unit 910 receives a request for a Wi-Fi Direct connection from an external wireless device 940, for example, the Wi-Fi Direct smart phone 120, the Wi-Fi Direct laptop computer 130, or the legacy WLAN laptop computer 140 of FIG. 1. The operation of the request for the Wi-Fi direct connection as above may be performed during a device discovery described above with reference to FIG. 2.

The image forming apparatus 900 supporting the Wi-Fi Direct receives a request for a device discovery from a user and searches whether there is a wireless device 940 that supports the Wi-Fi Direct. The request for the device discovery may be received via a user interface unit of the image forming apparatus 900. If the external wireless device 940 supporting the Wi-Fi Direct is found to be near as a result of the device discovery by the image forming apparatus 900, the image forming apparatus 900 generates, outputs, or displays the external wireless device 940 to a user via the user interface unit, and receives from the user a selection of the external wireless device 940 that the user wants to connect. Thereafter, the WLAN interface unit 910 receives a request for the Wi-Fi Direct connection from the external wireless device 940 selected by the user.

A memory unit 920 stores device information regarding wireless devices that were previously connected to the image forming apparatus 900 through the Wi-Fi Direct connection. The device information that is stored as stated above has been stored in advance before receiving a request for the Wi-Fi Direct connection from the WLAN interface unit 910. Here, the device information includes at least one of a MAC address and a DHCP client identifier of wireless devices that were previously Wi-Fi Direct connected to the image forming apparatus 900.

When allocation of an IP address via a DHCP server in an operation of establishing a connection to the wireless devices which had previously successfully performed the Wi-Fi Direct connection to the image forming apparatus 900 is completed, the image forming apparatus 900 receives the MAC address and the DHCP client identifier, for which the IP address is allocated. Here, the memory unit 920 stores the device information, such as the MAC address and the DHCP client identifier of wireless devices, which were previously successful in Wi-Fi Direct connection, in order to determine whether the external wireless device 940, which is attempting the Wi-Fi Direct connection to the image forming apparatus 900 at the present moment, is one that was previously connected.

The MAC address of the external wireless device 940 includes both a device address, which is used before the Wi-Fi Direct connection, and an interface address, which is used after the Wi-Fi Direct connection, and the memory unit 920 may store them individually. The DHCP client identifier of the external wireless device 940 is data included in a DHCP request data packet received by the image forming apparatus 900 during the allocation of an IP address via the DHCP server, and is coded data, for example.

A CPU 930 determines whether the device information of the external wireless device 940, which has requested the Wi-Fi Direct connection, is stored in the memory unit 920 or not, based on the device information stored in the memory unit 920. When the external wireless device 940 is determined as corresponding to the device information that is stored in the memory unit 920 in advance, the CPU 930 performs an operation of establishing a Wi-Fi Direct connection between the image forming apparatus 900 and the external wireless device 940 via the WLAN interface unit 910.

In detail, the CPU 930 compares the MAC address of the external wireless device 940 that has requested Wi-Fi Direct connection and the MAC address stored in the memory unit 920. Furthermore, the CPU 930 compares a DHCP client identifier of the external wireless device 940 that is received via the DHCP server with the DHCP client identifier stored in the memory unit 920.

An operation of pressing a WPS button according to a PBC method or a PIN method may be required during the wireless connection process between the Wi-Fi Direct devices. However, this may be inconvenient to a user if the same user attempts the Wi-Fi Direct connection in the same Wi-Fi Direct environment.

According to the embodiment of the present general inventive concept, it is possible to omit the operation of pressing a WPS button since the device information about wireless devices which were previously Wi-Fi Direct connected to the image forming apparatus 900 is stored in the memory unit 920. The CPU 930 determines whether the external wireless device 940, which has requested the Wi-Fi Direct connection, is a wireless device that was previously connected in the Wi-Fi Direct connection.

If the CPU 930 determines that the device information of the external wireless device 940 corresponds to the device information stored in the memory unit 920, the image forming apparatus 900 automatically establishes a Wi-Fi Direct connection without any input by a user to select or approve the Wi-Fi Direct connection via a user interface unit. Accordingly, when the user attempts the Wi-Fi Direct connection to the image forming apparatus 900 by using the external wireless device 940 which was previously Wi-Fi Direct connected, the user may perform the Wi-Fi Direct connection without a button press according to the PBC method and the PIN method of WPS.

The above-described function of allowing the Wi-Fi Direct devices to establish a Wi-Fi Direct connection without an input regarding approval of the Wi-Fi Direct connection may be established or cancelled directly by the user via the user interface unit included in the image forming apparatus 900 or an EWS.

Furthermore, a list of device information stored in the memory unit 920 may be directly managed by the user via the user interface unit included in the image forming apparatus 900 or an EWS. That is, a manager or a user of the image forming apparatus 900 may view a list of device information displayed via the user interface unit of the EWS, remove information from the list of the device information or add information to the list of the device information. Also, the manager or user of the image forming apparatus 900 may set to provide an easy reconnection function, which may not require a user selection, for example, an operation of pressing a WPS button, only to one or more particular ones of the wireless devices included in the list of the device information displayed via the user interface unit or the EWS. However, the easy reconnection function may not be applied to the rest of the wireless devices which can be connected through a user selection, for example, the operation of pressing a WPS button. The manager or user of the image forming apparatus 900 may obtain history information as to how often wireless devices corresponding to respective device information were Wi-Fi Direct connected to the image forming apparatus 900. The history information may include a connection frequency, a connection period, or etc., to correspond to characteristics of the previous connection.

FIG. 10 illustrates a list of the device information displayed by using a user interface unit or EWS. Referring to FIG. 10, the displayed list of device information shows a list of wireless devices which were previously successful in the Wi-Fi Direct connection to the image forming apparatus 900 and which are stored in the memory unit 920. As described above, the device information includes the MAC address and the DHCP client identifier of the wireless devices. In addition, the list of the device information may also display history information as to how often each of wireless devices was Wi-Fi Direct connected to the image forming apparatus 900.

The manager or the user of the image forming apparatus 900 may view information, remove information from, or add information to the list of the device information via a screen illustrated in FIG. 10. Also, although not illustrated in FIG. 10, the manager or user of the image forming apparatus 900 may set up to provide an easy reconnection function, which may not require a user selection or further process, for example, the operation of pressing a WPS button, only to one or more particular ones of the wireless devices from the list of device information displayed via the user interface unit or the EWS. However, the user may set up the easy reconnection function not to be applied to the rest of the wireless devices.

Figure 11:
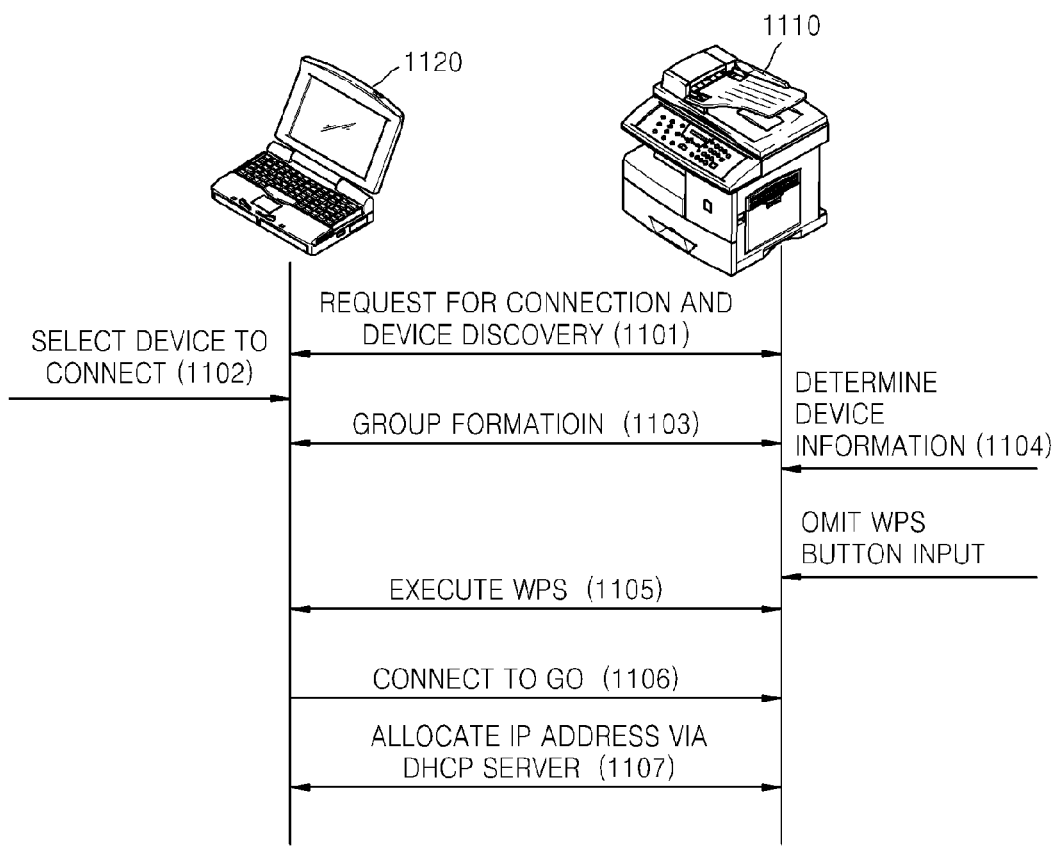
FIG. 11 illustrates an operation of Wi-Fi Direct connection of an image forming apparatus to support Wi-Fi Direct according to an embodiment of the present general inventive concept.

FIG. 11 illustrates an operation of a Wi-Fi Direct connection of an image forming apparatus supporting Wi-Fi Direct according to an embodiment of the present general inventive concept. Referring to FIG. 11, the operation of the Wi-Fi Direct connection according to the embodiment of the present general inventive concept is performed in the image forming apparatus 900 of FIG. 9. Since the descriptions above about general Wi-Fi Direct technology described with reference to FIG. 8 and the description with reference to FIG. 9 may also be applied to the operation of the Wi-Fi Direct connection of FIG. 11 according to the embodiment of the present general inventive concept, detail descriptions thereof will be omitted.

In operation 1101, an image forming apparatus 1110 functions as an AGO and may form a network by itself, and transmits one or more beacon packets corresponding to a request for a connection periodically and wirelessly and is on a standby state so that one or more wireless devices disposed adjacent to the image forming apparatus 1110 may be able to attempt the Wi-Fi Direct connection. When a user performs a device discovery of the Wi-Fi Direct devices in a wireless device 1120, the wireless device 1120 wirelessly transmits a probe request packet to the image forming apparatus 1110. The image forming apparatus 1110 that has received the probe request packet of the wireless device 1120 responds to the wireless device 1120 by transmitting a probe response packet to the wireless device 1120. A WLAN interface unit of the image forming apparatus 1110 receives a provision discovery request packet, which is a request for the Wi-Fi Direct connection, from the wireless device 1120. Here, upon receiving the request for the Wi-Fi Direct connection from the wireless device 1120, an LED included in the image forming apparatus 1110 may blink to inform the user that a request for the connection has been received from the wireless device 1120.

In operation 1102, the wireless device 1120 displays the image forming apparatus 1110 that supports the Wi-Fi Direct to the user, and receives a selection of the image forming apparatus 1110 from the user.

In operation 1103, when the selection of the image forming apparatus 1110 is input via the wireless device 1120, the image forming apparatus 1110 performs group information with the wireless device 1120 which is to be Wi-Fi Direct connected.

In operation 1104, the image forming apparatus 1110, for example, the CPU of the image forming apparatus 1110, determines whether device information (for example, MAC address) of the wireless device 1120, which has requested the Wi-Fi Direct connection, is stored in a memory unit, based on the device information (MAC address) stored in the memory unit.

If the device information (MAC address) of the wireless device 1120 is determined as corresponding to the device information (MAC address) stored in the memory unit, the image forming apparatus 1110 automatically attempts to establish a Wi-Fi Direct connection without any input by the user regarding approval of the Wi-Fi Direct connection via the user interface unit. Here, the image forming apparatus 1110 transmits a response for the Wi-Fi Direct connection (provision discovery response packet) to the wireless device 1120. Accordingly, if the user again attempts the Wi-Fi Direct connection to the image forming apparatus 1110, by using the same wireless device 1120 which was previously Wi-Fi Direct connected before the current connection attempt, the user may set the Wi-Fi Direct connection without a user input, for example, an input of a WPS button.

In operation 1105, when the group is formed, the image forming apparatus 1110 and the wireless device 1120 belonging to the group may set WPS or Wi-Fi Simple Configuration (WSC) to perform a secure connection with each other. Here, when the Wi-Fi Direct connecting is performed, the secure connection may be performed by encoding using a WPA2-PSK authorization method.

In operation 1106, when the secure connection is completed, the wireless device 1120, which is a client, is connected to the image forming apparatus 1110, which is an AGO.

In operation 1107, the image forming apparatus 1110, for example, a DHCP server of the mage forming apparatus 1110, allocates an IP address to the wireless device 1120, which is a client, to thereby complete the Wi-Fi Direct connection between the image forming apparatus 1110 and the wireless device 1120.

Figure 12:
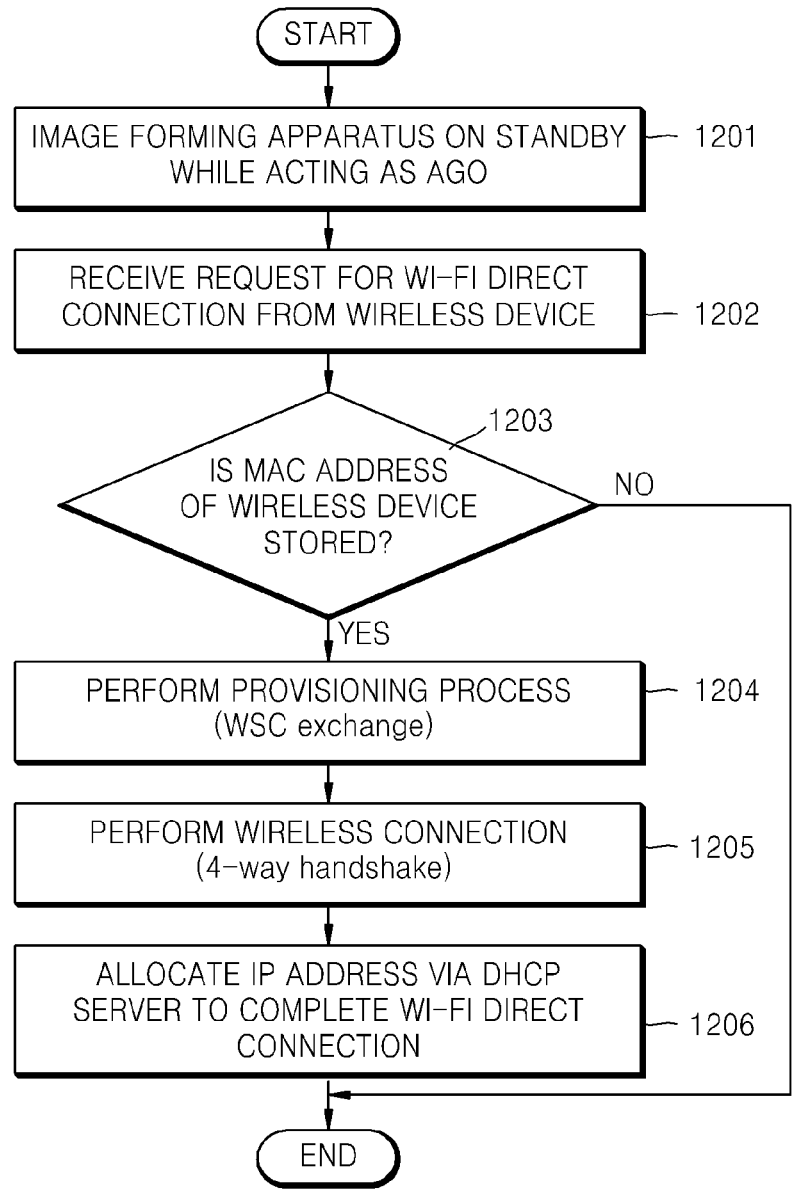
FIG. 12 is a detailed flowchart of an operation of Wi-Fi Direct connection of an image forming apparatus to support Wi-Fi Direct, according to an embodiment of the present general inventive concept.

FIG. 12 is a detailed flowchart illustrating an operation of a Wi-Fi Direct connection of an image forming apparatus supporting a Wi-Fi Direct, according to an embodiment of the present general inventive concept. Referring to FIG. 12, the operation of the Wi-Fi Direct connection according to the embodiment of the present general inventive concept may be sequentially performed. Since descriptions above about the general Wi-Fi Direct technology with reference to FIGS. 1 through 8 and with reference to FIGS. 9 through 11 may also be applied to the Wi-Fi Direct connection of FIG. 12 according to the embodiment of the present general inventive concept, detail descriptions thereof will be omitted below.

In operation 1201, the image forming apparatus 900 may function as an AGO and form a network by itself, and transmit one or more beacon packets periodically and wirelessly and be on a standby state so that one or more wireless devices disposed to be able to communicate with the image forming apparatus 900 may attempt the Wi-Fi Direct connection.

In operation 1202, the WLAN interface unit 910 of the image forming apparatus 900 receives a provision discovery request packet for the WI-Fi Direct connection from the external wireless device 940.

In operation 1203, the image forming apparatus 900, for example, the CPU 930 of the image forming apparatus 900, determines whether the device information (MAC address) of the external wireless device 940, which has requested the current Wi-Fi Direct connection, is stored in the memory unit 920, based on the device information (MAC address) stored in the memory unit 920.

When the external wireless device 940 is determined as an external wireless device corresponding to the device information that is stored in the memory unit 920, the method proceeds to operation 1204, in which the Wi-Fi Direct connection is automatically attempted without an input of a user regarding approval of the Wi-Fi Direct connection via the user interface unit. That is, establishment of the Wi-Fi Direct connection is automatically attempted without a user input, for example, an input of a WPS button by a user. Here, the image forming apparatus 900 transmits a provision discovery response packet for the Wi-Fi Direct connection to the external wireless device 940. However, if the device information of the external wireless device 940 (for example, MAC address) is determined as a wireless device not corresponding to the device information (MAC address) stored in the memory unit 920, the image forming apparatus 900 may end a connection with the external wireless device 940.

In operation 1204, as a part of provisioning, the image forming apparatus 900, which is an AGO, functions as an AP so as to operate as an internal registrar, and the external wireless device 940 operates as an enrollee, thereby performing a Wi-Fi simple configuration (WSC) exchange.

In operation 1205, when the provisioning is completed, the external wireless device 940 transmits an authentication/association request packet to the image forming apparatus 900, and the image forming apparatus 900 transmits an authentication/association response packet as a response thereto, and then a 4-way handshake operation is performed to complete the wireless connection operation.

In operation 1206, the image forming apparatus 900, particularly, a DHCP server, allocates an IP address to the external wireless device 940, which is a client, to thereby complete Wi-Fi Direct connection between the image forming apparatus 900 and the external wireless device 940.

The image forming apparatus 900 according to the embodiment of FIGS. 11 and 12, for example, the CPU 930 of the image forming apparatus 900, conducts the determination by using only the MAC address of the external wireless device 940 and the MAC address stored in the memory unit 920. However, it is possible that the image forming apparatus 900 of FIGS. 13 and 14 according to an embodiment of the present general inventive concept, for example, the CPU 930 of the image forming apparatus 900, conducts the determination by using both the MAC address and the DHCP client identifier. Using the DHCP identifier in addition to the MAC address in the determination prevents an automatic connection of an ill-intended user to the image forming apparatus 900 by stealing the same MAC address as that of the wireless device which was previously connected. Packets according to the DHCP are transmitted or received while being coded, and thus, a value of a client identifier in a DHCP packet obtained from a wireless device that was previously connected cannot be used by an ill-intended user. Hereinafter, the determination by using both the MAC address and the DHCP client identifier will be described.

Figure 13:
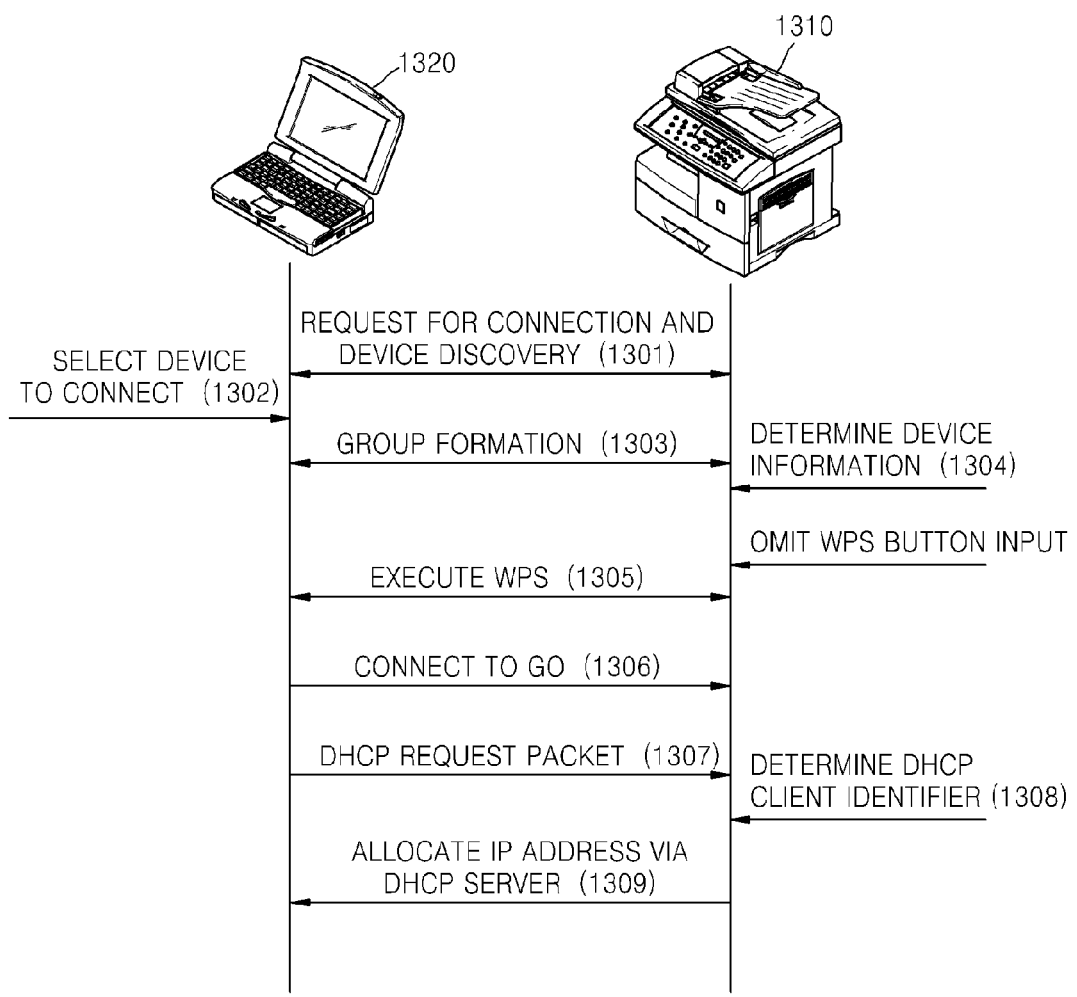
FIG. 13 illustrates an operation of Wi-Fi Direct connection of an image forming apparatus to support Wi-Fi Direct, according to an embodiment of the present general inventive concept.

FIG. 13 illustrates an operation of a Wi-Fi Direct connection of an image forming apparatus supporting a Wi-Fi Direct, according to an embodiment of the present general inventive concept. Referring to FIG. 13, the operation of the Wi-Fi Direct connection according to the current embodiment may be performed in order in the image forming apparatus 900, and includes operations illustrated in FIGS. 11 and 12. Since descriptions above about the general Wi-Fi Direct technology described with reference to FIGS. 1 through 8 and the description with reference to FIGS. 9 through 12 may be also applied to the Wi-Fi Direct connection of FIG. 13 according to the embodiment of the present general inventive concept, detail descriptions thereof will be omitted below.

In operation 1301, an image forming apparatus 1310 operates as an AGO to form a single wireless network by itself, and wirelessly and periodically transmits a beacon packet and is on a standby state so that one or more external wireless devices may attempt the Wi-Fi Direct connection with the image forming apparatus 1310. When a user performs a device discovery regarding Wi-Fi Direct devices in a wireless device 1320, the wireless device 1320 wirelessly transmits a probe request packet. The image forming apparatus 1310 transmits a probe response packet to the wireless device 1320 upon receiving the probe request packet from the wireless device 1320. A WLAN interface unit of the image forming apparatus 1310 receives a provision discovery request packet for the Wi-Fi Direct connection from the wireless device 1320.

In operation 1302, the wireless device 1320 displays to the user the found image forming apparatus 1310 that supports a Wi-Fi function, and receives a selection of the image forming apparatus 1310.

In operation 1303, when the selection of the image forming apparatus 1310 is input via the wireless device 1320, the image forming apparatus 1310 performs a group formation with respect to the wireless device 1320 that is to be Wi-Fi Direct connected.

In operation 1304, the image forming apparatus 1310, for example, a CPU of the image forming apparatus 1310, determines whether device information (for example, MAC address) of the wireless device 1310, which has requested Wi-Fi Direct connection, is stored in a memory unit, based on device information (MAC address) stored in the memory unit.

If the device information (MAC address) of the wireless device 1310 is determined as a wireless device corresponding to the device information (MAC address) stored in the memory unit, the image forming apparatus 1310 automatically attempts to establish a Wi-Fi Direct connection without any input by the user regarding approval of the Wi-Fi Direct connection via the user interface unit. Here, the image forming apparatus 1310 transmits a response for the Wi-Fi Direct connection (provision discovery response packet) to the wireless device 1320. Accordingly, if the user again attempts the Wi-Fi Direct connection to the image forming apparatus 1110 by using the same wireless device 1320, which was previously Wi-Fi Direct connected before the currently attempting connection, the user may set an option on the Wi-Fi Direct connection, for example, an connection option without a user input, for example, an input of a WPS button.

In operation 1305, when the group is formed, the image forming apparatus 1310 and the wireless device 1320 belonging to the group may set a WPS or WSC to perform a secure connection with each other. Here, when Wi-Fi Direct connecting, the secure connection may be performed by encoding using the WPA2-PSK authorization method.

In operation 1306, when the secure connection is completed, the wireless device 1320, which is a client, is connected to the image forming apparatus 1310, which is an AGO.

In operation 1307, the image forming apparatus 1310 receives a DHCP request packet from the wireless device 1320. Here, encoded information about the device information of the wireless device 1320 is included in the DHCP request packet.

In operation 1308, the image forming apparatus 1310, for example, the CPU of the image forming apparatus 1310, determines whether the device information (for example, DHCP client identifier) of the wireless device 1320, which has requested Wi-Fi Direct connection, is included in the memory unit 1320 based on the device information (DHCP client identifier) stored in the memory unit.

In operation 1309, when the device information (DHCP client identifier) of the wireless device 1320 is determined as a wireless device corresponding to the device information (DHCP client identifier) stored in the memory unit, a DHCP server of the image forming apparatus 1310 allocates an IP address to the wireless device 1320, which is a client to thereby complete the Wi-Fi Direct connection between the image forming apparatus 1310 and the wireless device 1320.

Figure 14:
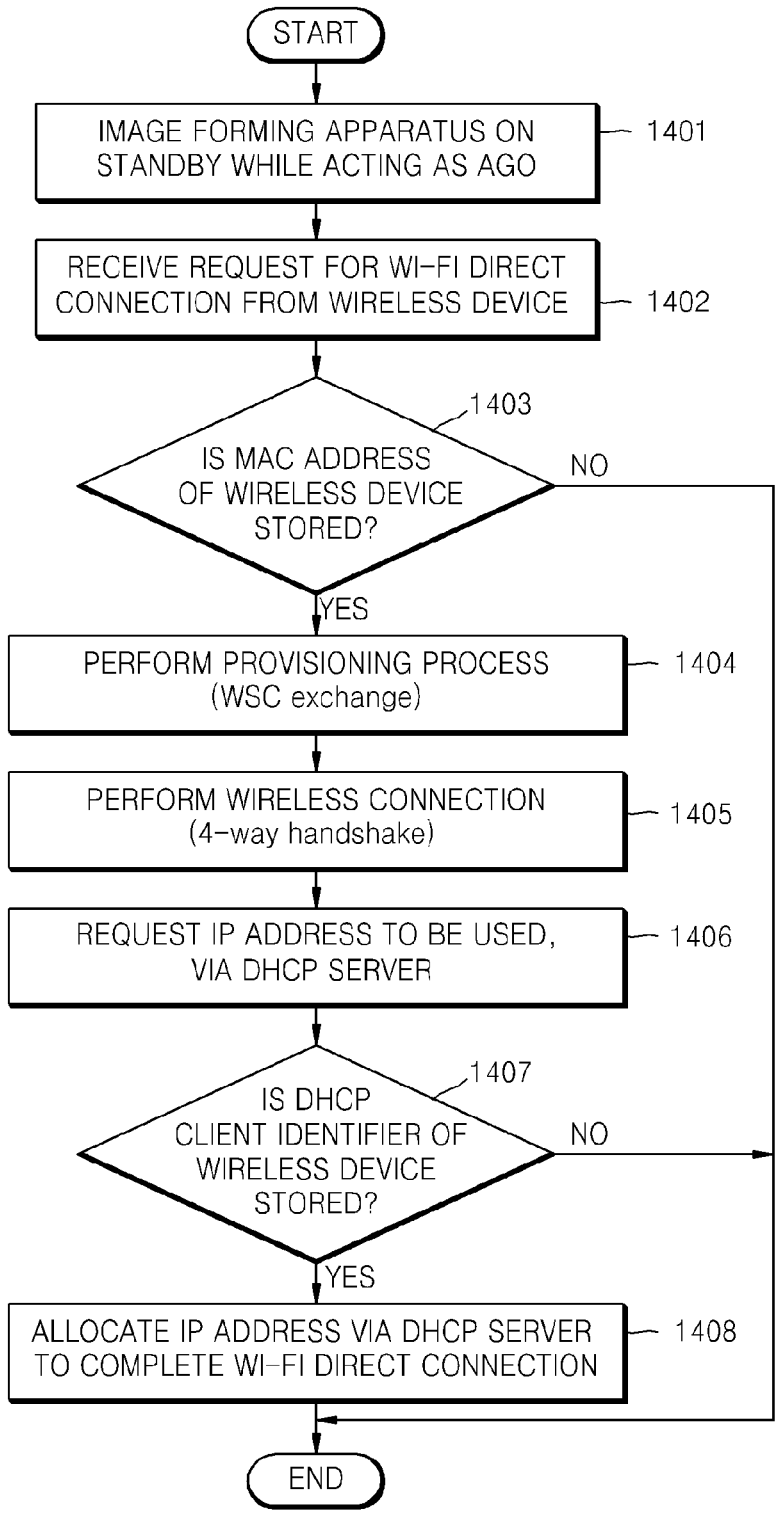
FIG. 14 illustrates an operation of Wi-Fi Direct connection of an image forming apparatus to support Wi-Fi Direct, according to an embodiment of the present general inventive concept.

FIG. 14 illustrates an operation of a Wi-Fi Direct connection of an image forming apparatus supporting a Wi-Fi Direct, according to an embodiment of the present general inventive concept. Referring to FIG. 14, a method of performing the Wi-Fi Direct connection according to the embodiment may time-sequentially performed in the image forming apparatus 900 of FIG. 9, and thus, the method of FIG. 14 includes operations illustrated in FIGS. 11 and 12. Since descriptions above about the general Wi-Fi Direct technology with reference to FIGS. 1 through 8 and with reference to FIGS. 9 through 13 may be also applied to the Wi-Fi Direct connection of FIG. 14 according to the embodiment of the present general inventive concept, detail descriptions thereof will be omitted below.

In operation 1401, the image forming apparatus 900 operates as an AGO to form a single wireless network by itself, and is on a standby state so that near wireless devices may attempts the Wi-Fi Direct connection.

In operation 1402, the WLAN interface unit 910 of the image forming apparatus 900 receives a provision discovery request packet for the Wi-Fi Direct connection, from the external wireless device 940.

In operation 1403, the image forming apparatus 900, for example, the CPU 930 of the image forming apparatus 900, determines whether the device information (for example, MAC address) of the external wireless device 940, which has requested the Wi-Fi Direct connection, is included in the memory unit 920 based on the device information (MAC address) stored in the memory unit 920.

When the external wireless device 940 is determined as a wireless device corresponding to the device information that is stored in the memory unit 920, the operation proceeds to operation 1404, in which the Wi-Fi Direct connection is automatically attempted without an input of a user regarding approval of the Wi-Fi Direct connection via the user interface unit. That is, establishment of Wi-Fi Direct connection is automatically attempted without a user input, for example, an input of a WPS button of the user. Here, the image forming apparatus 900 transmits a provision discovery response packet for the Wi-Fi Direct connection to the external wireless device 940. However, if the device information of the external wireless device 940 (MAC address) is determined as a wireless device not corresponding to the device information (MAC address) stored in the memory unit 920, the image forming apparatus 900 may terminate a connection to the external wireless device 940.

In operation 1404, as a part of provisioning, the image forming apparatus 900, which is an AGO, functions as an AP so as to operate as an internal registrar, and the external wireless device 940 operates as an enrollee, thereby performing a WSC exchange.

In operation 1405, when the provisioning is completed, the external wireless device 940 transmits an authentication/association request packet to the image forming apparatus 900, and the image forming apparatus 900 responds by transmitting an authentication/association response, and then a 4-way handshake operation is performed to thereby complete the wireless connection operation.

In operation 1406, the image forming apparatus 900 receives a request for an IP address that is to be used from the external wireless device 940 via a DHCP.

In operation 1407, the image forming apparatus 900, for example, the CPU 930 of the image forming apparatus 900, determines whether the device information (DHCP client identifier) of the external wireless device 940, which has requested the current Wi-Fi Direct connection, is included in the memory unit 920 based on the device information (DHCP client identifier) stored in the memory unit 920. That is, the CPU 930 determines the MAC address in operation 1403 in advance, and further determines the DHCP client identifier in operation 1407.

If the device information (DHCP client identifier) of the external wireless device 940 is determined as corresponding to the device information (DHCP client identifier) of the memory unit 920, the method proceeds to operation 1408. However, if the device information (DHCP client identifier) of the external wireless device 940 is determined as a wireless device not corresponding to the device information (DHCP client identifier) included in the memory unit 920, a connection to the external wireless device 940 may end.

In operation 1408, the image forming apparatus 900, for example, a DHCP server of the image forming apparatus 900, allocates an IP address to the external wireless device 940, which is a client, thereby completing the Wi-Fi Direct connection between the image forming apparatus 900 and the external wireless device 940.

Figure 15:
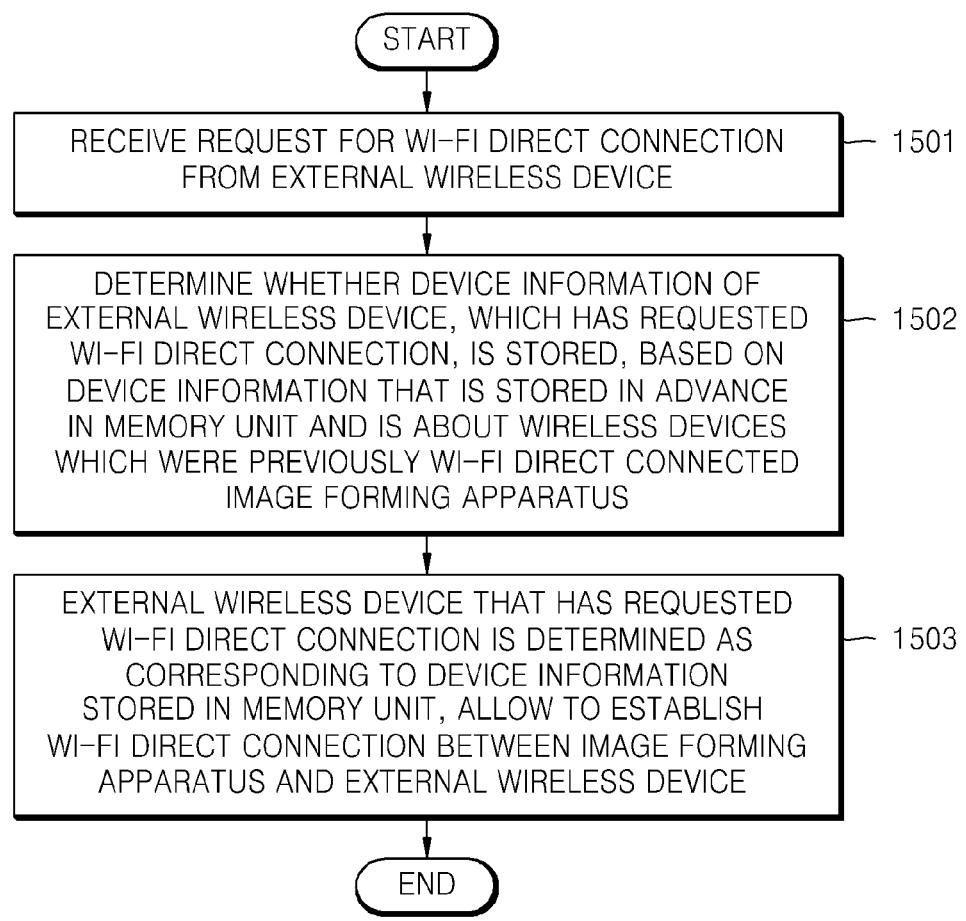
FIG. 15 is a flowchart illustrating a method of Wi-Fi Direct connecting in an image forming apparatus to support Wi-Fi Direct according to an embodiment of the present general inventive concept.

FIG. 15 is a flowchart illustrating a method of performing a Wi-Fi Direct connection in an image forming apparatus supporting a Wi-Fi Direct according to an embodiment of the present general inventive concept. The method of FIG. 15 includes operations illustrated in FIGS. 11 through 14.

In operation 1501, the WLAN interface unit 910 receives a request for Wi-Fi Direct connection from the external wireless device 940.

In operation 1502, the CPU 930 determines whether the device information of the external wireless device 940, which has requested the Wi-Fi Direct connection, is stored, based on device information that is stored in advance in the memory unit 920 and corresponds to a wireless device which was previously Wi-Fi Direct connected to the image forming apparatus 900.

In operation 1503, if the external wireless device 940 that has requested the current Wi-Fi Direct connection is determined as a wireless device corresponding to the device information stored in the memory unit 920, the CPU 930 allows to establish a Wi-Fi Direct connection between the image forming apparatus 900 and the external wireless device 940.

In the image forming apparatus 900 supporting the Wi-Fi Direct and the method of performing the Wi-Fi Direct connection of the image forming apparatus 900 supporting Wi-Fi Direct according to an embodiment of the present general inventive concept, device information of wireless devices that were previously connected is stored, and when the same wireless devices attempts the Wi-Fi Direct connection, the stored device information is used to quickly establish a connection without a user input, for example, an input of a WPS button. Therefore, when the same wireless devices that were previously connected attempt the Wi-Fi Direct connection, the connection can be easily performed without inconvenience of pressing the WPS button of the image forming apparatus 900 each time.

As described above, when the Wi-Fi Direct connection is performed in an image forming apparatus supporting the Wi-Fi Direct, by determining whether a wireless device which is currently attempting the Wi-Fi Direct connection has been previously connected to the Wi-Fi Direct or not, the Wi-Fi Direct connection may be established without inputting a user input, for example, a WPS button to thereby provide inconvenience to the user by excluding an operation of pressing or selecting a WPS button every time. Also, Wi-Fi Direct devices may be connected quickly and easily in an image forming apparatus that supports the Wi-Fi Direct.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus supporting Wi-Fi Direct, the image forming apparatus comprising:
   a wireless interface unit to receive a request for a Wi-Fi Direct connection from an external wireless device;
   a memory unit to store device information about wireless devices that were previously Wi-Fi Direct connected to the image forming apparatus including MAC addresses and Dynamic Host Configuration Protocol, DHCP, client identifiers of the wireless devices that were previously Wi-Fi Direct connected to the image forming apparatus, the DHCP client identifiers being coded by the wireless devices and sent to the image forming apparatus in a DHCP request data packet; and
   a central processing unit to determine whether device information of the external wireless device that has requested the Wi-Fi Direct connection is stored in the memory unit, based on the stored device information,
   wherein when the external wireless device that has requested the Wi-Fi Direct connection is determined as corresponding to the stored device information, enabling, by the central processing unit, the Wi-Fi Direct connection between the image forming apparatus and the external wireless device via the wireless interface unit without a user input for Wi-Fi Protected Setup, WPS, via a user interface unit of the image forming apparatus.

2. The image forming apparatus of claim 1, wherein the central processing unit enabling the Wi-Fi Direct connection without the user input about approval of the Wi-Fi Direct connection according to a push button configuration, PBC, method or a personal identification number, PIN, method of the WPS of the user interface unit.

3. The image forming apparatus of claim 1, wherein the central processing unit enabling the Wi-Fi Direct connection by comparing a MAC address of the external wireless device that has requested the Wi-Fi Direct connection and the MAC addresses stored in the memory unit.

4. The image forming apparatus of claim 1, further comprising a DHCP server unit that allocates an IP address to the external wireless device if a MAC address of the external wireless device that has requested the Wi-Fi Direct connection is stored in the memory unit,
   wherein the central processing unit enabling the Wi-Fi Direct connection by comparing a DHCP client identifier of the external wireless device that is received via the DHCP server unit and the DHCP client identifiers stored in the memory unit to establish the Wi-Fi Direct connection.

5. The image forming apparatus of claim 1, wherein a list of the device information stored in the memory unit is manageable by using at least one of the user interface unit and an embedded web server, EWS, included in the image forming apparatus.

6. An image forming apparatus supporting Wi-Fi Direct, comprising:
   a print engine to conduct a printing operation;
   a memory unit to store device information about wireless devices that were previously Wi-Fi Direct connected to the image forming apparatus, the stored device information including MAC addresses and Dynamic Host Configuration Protocol, DHCP, client identifiers of the wireless devices that were previously Wi-Fi Direct connected to the image forming apparatus, the DHCP client identifiers being coded by the wireless devices and sent to the image forming apparatus in a DHCP request data packet;
   a first wireless interface unit to connect to an access point, AP, of a network infrastructure;
   a second wireless interface unit to receive a request for Wi-Fi Direct connection from an external wireless device;
   a central processing unit to determine whether device information of the external wireless device that has requested Wi-Fi Direct connection is stored in the memory unit, based on the stored device information;
   a soft AP unit to act as an AP when a Wi-Fi Direct connection is established; and
   DHCP server unit to allocate an IP address to the external wireless device that is Wi-Fi Direct connected to the image forming apparatus,
   wherein, if the external wireless device that has requested a Wi-Fi Direct connection is determined as corresponding to the stored device information, enabling, by the central processing unit, the Wi-Fi Direct connection between the image forming apparatus and the external wireless device via the second wireless interface unit without a user input for Wi-Fi Protected Setup, WPS, via a user interface unit of the image forming apparatus.

7. A method of performing a Wi-Fi Direct connection in an image forming apparatus, the method comprising:
   receiving a request for the Wi-Fi Direct connection from an external wireless device;
   determining whether device information of the external wireless device that has requested the Wi-Fi Direct connection is stored, based on device information about wireless devices that were previously Wi-Fi Direct connected to the image forming apparatus which is stored in advance;
   enabling the Wi-Fi Direct connection if the external wireless device that has requested the Wi-Fi Direct connection is determined as a device corresponding to the stored device information without a user input for Wi-Fi Protected Setup, WPS, via a user interface unit of the image forming apparatus if the external wireless device corresponds to the stored device information,
   wherein the stored device information comprise MAC addresses and Dynamic Host Configuration Protocol, DHCP, client identifiers of the wireless devices that were previously Wi-Fi Direct connected to the image forming apparatus, the DHCP client identifiers being coded by the wireless devices and sent to the image forming apparatus in a DHCP request data packet.

8. The method of claim 7, wherein the determining comprises comparing a MAC address of the external wireless device that has requested the Wi-Fi Direct connection and the MAC addresses that are stored in advance, wherein the enabling the Wi-Fi Direct connection comprises establishing a Wi-R Direct connection between the image forming apparatus and the external wireless device when the MAC address of the external wireless device that has requested the Wi-Fi Direct connection is determined as corresponding to the MAC addresses that are stored in advance.

9. The method of claim 8, wherein the determining further comprises comparing a DHCP client identifier of the external wireless device that has requested the Wi-Fi Direct connection with a previously stored DHCP client identifier if the MAC address of the external wireless device that has requested the Wi-Fi Direct connection is compared and corresponds to a previously stored MAC address, wherein the enabling the Wi-H Direct connection comprises establishing a Wi-Fi Direct connection between the image forming apparatus and the external wireless device when the MAC address of the external wireless device that has requested the Wi-Fi Direct connection is determined as corresponding to the MAC address that is stored in advance.

10. A non-transitory computer-readable recording medium having embodied thereon a program to execute the method of claim 7.

11. An image forming apparatus to support Wi-Fi Direct, comprising:

a wireless interface unit to receive a request for a current Wi-Fi Direct connection from an external wireless device; and a central processing unit to determine whether there was a previous Wi-Fi Direct connection with the external wireless device based on device information including MAC addresses and Dynamic Host Configuration Protocol, DHCP, client identifiers of the wireless devices that were previously Wi-Fi Direct connected to the image forming apparatus, the DROP client identifiers being coded by the wireless devices and sent to the image forming apparatus in a DHCP request data packet, and to establish the current Wi-Fi Direct connection with the external wireless device according to a determination without a user input for Wi-Fi Protected Setup, WPS, via a user interface unit of the image forming apparatus, to receive one of a command and data according to the established current Wi-Fi Direct connection, and to perform a printing operation using a print engine according to the received one of the command and the data.

12. The image forming apparatus of claim 11, wherein the central processing unit establishes the current Wi-Fi Direct connection without a user input of one of a push button and a pin code.

13. The image forming apparatus of claim 11, wherein the central processing unit compares previous information obtained through the previous Wi-Fi Direct connection with information on the current Wi-Fi Direct connection to determine that the external wireless device previously had the previous Wi-Fi Direct connection with the wireless interface unit.

* * * * *